United States Patent
Williams et al.

(10) Patent No.: US 10,899,207 B2
(45) Date of Patent: Jan. 26, 2021

(54) TONNEAU COVER STRUCTURED TO REDIRECT AIRFLOW AROUND VEHICLE

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 35 days.

(21) Appl. No.: 16/453,060

(22) Filed: Jun. 26, 2019

(65) Prior Publication Data
US 2020/0406731 A1    Dec. 31, 2020

(51) Int. Cl.
*B60J 7/08*    (2006.01)
*B60J 7/16*    (2006.01)

(52) U.S. Cl.
CPC .................. *B60J 7/1607* (2013.01)

(58) Field of Classification Search
CPC .... B62D 35/00; B62D 35/001; B62D 35/007; B62D 37/02; B60J 7/1607; B60J 7/10; B60J 7/102
USPC ...... 296/136.03, 100.01, 100.02, 208, 180.1, 296/180.2
See application file for complete search history.

(56) References Cited

U.S. PATENT DOCUMENTS

| | | |
|---|---|---|
| 1,923,349 A | 8/1933 | Wolverton |
| 2,119,905 A * | 6/1938 | Crawford ........... B60H 1/00014 454/152 |
| 2,241,755 A | 5/1941 | Zaccone |
| 4,072,336 A | 2/1978 | Ruzicka |
| 4,455,045 A | 6/1984 | Wheeler |
| 4,558,634 A | 12/1985 | Oshiro et al. |
| 6,779,834 B1 | 8/2004 | Keller |
| 9,393,855 B2 | 7/2016 | Rohr et al. |
| 9,487,248 B1 | 11/2016 | Buckhalt et al. |
| 9,682,733 B2 | 6/2017 | Krishnan et al. |
| 9,884,627 B1 | 2/2018 | Gage et al. |
| 9,925,853 B2 | 3/2018 | Aubrey et al. |
| 10,093,150 B2 * | 10/2018 | Waldner ............... B60H 1/248 |
| 2002/0089202 A1 | 7/2002 | Henderson |
| 2003/0038508 A1 | 2/2003 | Fairburn et al. |
| 2003/0193216 A1 | 10/2003 | Fairburn et al. |
| 2006/0170245 A1 | 8/2006 | Shahbazi |
| 2017/0240226 A1 | 8/2017 | Brooks et al. |

FOREIGN PATENT DOCUMENTS

WO    2016198456 A1    12/2016

* cited by examiner

*Primary Examiner* — Dennis H Pedder
(74) *Attorney, Agent, or Firm* — Christopher G. Darrow; Darrow Mustafa PC

(57) ABSTRACT

A tonneau cover for a vehicle cargo bed includes a first airflow passage extending along an interior of the tonneau cover. An airflow inlet is structured to enable airflow from an exterior of the tonneau cover into the first airflow passage. An airflow outlet is structured to enable a discharge of air from the first airflow passage to an exterior of the tonneau cover. A cross-sectional area of the first airflow passage decreases in a direction extending from the airflow inlet toward the airflow outlet.

10 Claims, 4 Drawing Sheets

TONNEAU COVER STRUCTURED TO REDIRECT AIRFLOW AROUND VEHICLE

The subject matter described herein relates in general to vehicle tonneau covers and, more particularly, to a tonneau cover structured to redirect airflow around a moving vehicle on which the cover is mounted.

BACKGROUND

Air passing over the cab of a moving pickup truck may flow over the cab and down into a region behind the cab and above a tonneau cover mounted on the truck, creating a turbulent air pocket which may increase the drag on the moving vehicle.

SUMMARY OF THE INVENTION

In one aspect of the embodiments described herein, a tonneau cover for a vehicle cargo bed is provided. The tonneau cover includes a first airflow passage extending along an interior of the tonneau cover. An airflow inlet is structured to enable airflow from an exterior of the tonneau cover into the first airflow passage. An airflow outlet is structured to enable a discharge of air from the first airflow passage to an exterior of the tonneau cover. A cross-sectional area of the first airflow passage decreases in a direction extending from the airflow inlet toward the airflow outlet.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
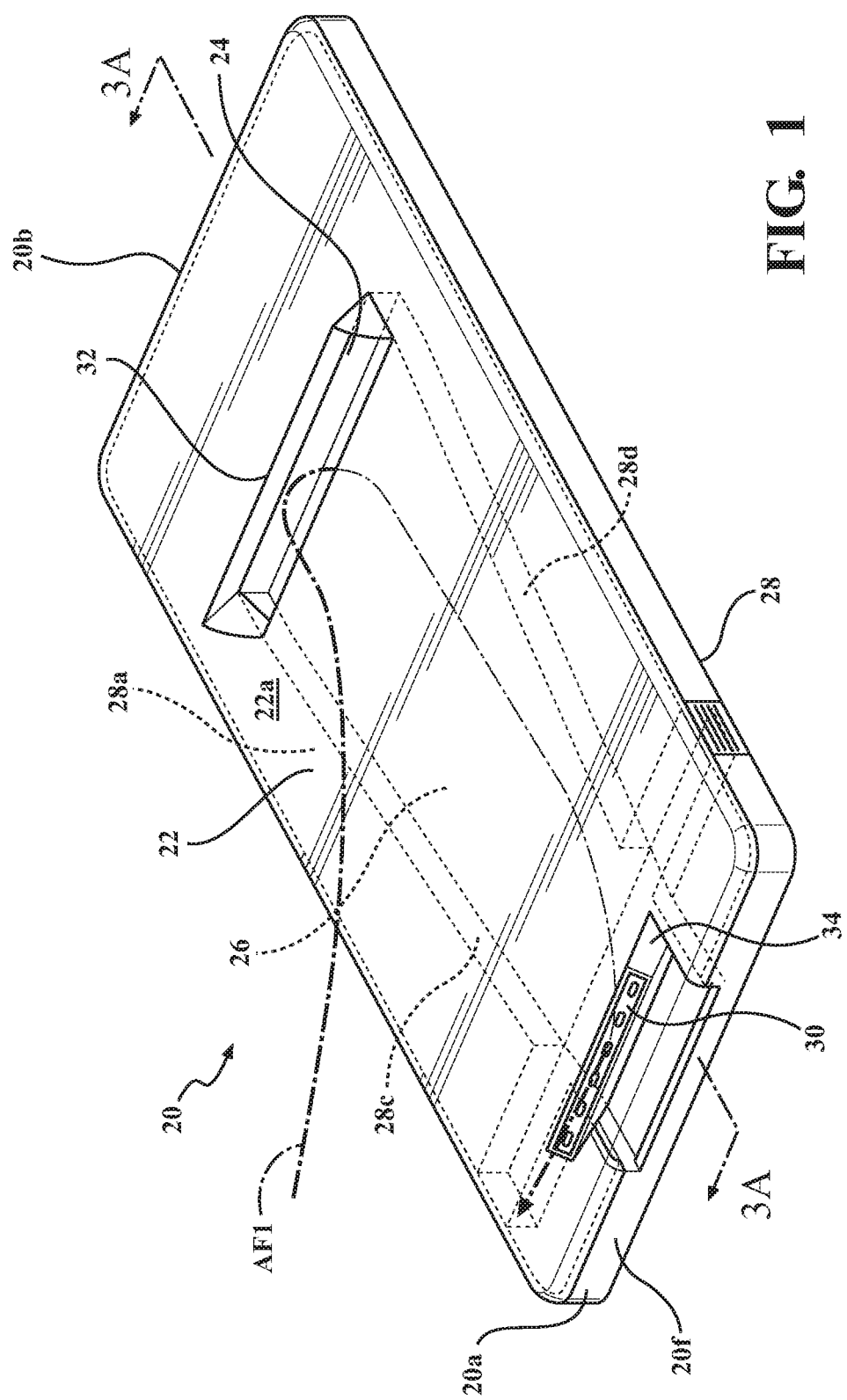
FIG. 1 is a schematic perspective view of a tonneau cover in accordance with an embodiment described herein.

In one or more arrangements described herein, a tonneau cover is provided for a vehicle having a cab and a cargo bed located behind the cab. The tonneau cover includes a first airflow passage extending along an interior of the tonneau cover. An airflow inlet is structured to enable airflow from an exterior of the tonneau cover into the first airflow passage. An airflow outlet is structured to enable a discharge of air from the first airflow passage to an exterior of the tonneau cover. A cross-sectional area of the first airflow passage decreases in a direction extending from the airflow inlet toward the airflow outlet. The airflow outlet tonneau cover incorporates an airflow discharge door with discharge openings enabling air exiting the airflow passage to be directed upwardly and onto a rear portion of the truck cab. This airflow then flows upwardly along the rear of the cab, disrupting and deflecting the air tending to flow along the top of the cab and behind the cab due to movement of the truck. This aids in preventing formation of a turbulent air pocket behind the can and above the tonneau cover.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

Figure 6:
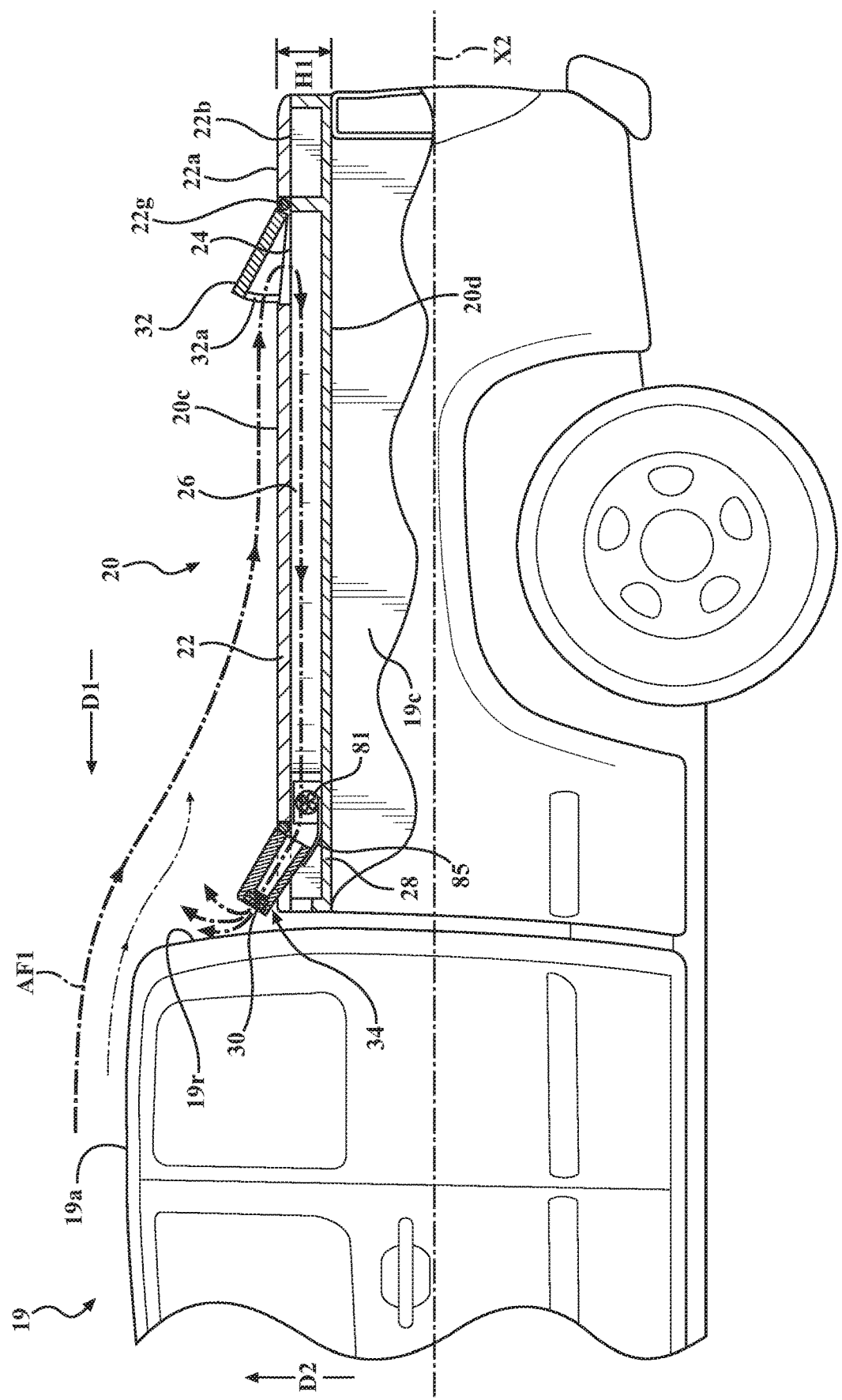
FIG. 6 is a schematic cross-sectional side view of the tonneau cover embodiment of FIGS. 1-5 shown mounted on a pickup truck, and showing operation of the tonneau cover to redirect an airflow over the truck cab.

FIG. 1 is a schematic perspective view of a tonneau cover 20 in accordance with an embodiment described herein. The tonneau cover 20 may be structured to cover a cargo bed of a pickup truck, for example. The tonneau cover 20 may have a first end 20a and a second end 20b opposite the first end. In one or more arrangements, the first end 20a may be structured to be a front or forward end of the tonneau cover when the cover is mounted on a vehicle, and the second end 20b may be structured to be a rear or backward end of the tonneau cover when the cover is mounted on the vehicle. The front end 20a of the cover may be an end structured to reside adjacent to and closest to a cab 19a of the pickup truck 19 when the tonneau cover 20 is mounted on the pickup truck so as to cover the cargo bed 19c, as shown in FIG. 6. The tonneau cover 20 may be formed from any suitable material or materials (for example, polymers, metals, etc.) using any suitable methods, such as molding, forming, etc.

Figure 2:
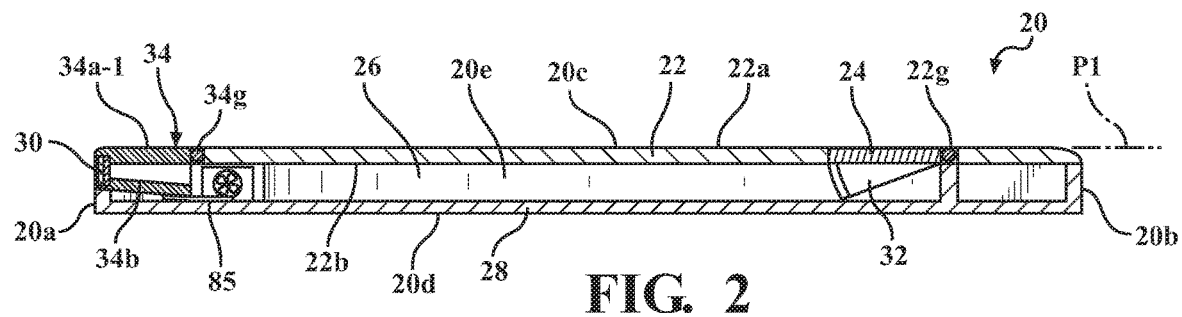
FIG. 2 is a schematic cross-sectional side view of the tonneau cover shown in FIG. 1, showing each of an airflow inlet door and an airflow discharge door of the tonneau cover in a closed condition.

FIG. 2 is a schematic cross-sectional side view of the tonneau cover 20 shown in FIG. 1. Referring to FIGS. 1 and 2, the tonneau cover may have a first side 20c, a second side 20d opposite the first side 20c, and an interior 20e residing between the first side 20c and the second side 20d. At least a portion of the interior 20e may define a first airflow passage 26 (described below) extending through the tonneau cover 20. The first side 20c may be a side structured to face away from a vehicle cargo bed 19c when the cover 20 is mounted on the pickup truck 19 so as to cover the cargo bed, as shown in FIG. 6. The second side 20d may be a side structured to face toward a floor (not shown) of the cargo bed 19c when the cover 20 is mounted on the pickup truck 19 so as to cover the cargo bed.

In one or more arrangements, the tonneau cover 20 may include a first panel 22. The first panel 22 may be structured to be a top panel of the tonneau cover 20 when the cover 20 is secured to the vehicle 19 so as to cover the vehicle cargo bed. The first panel 22 may form the first side 20c of the tonneau cover 20. A first panel 22 as described herein may be fabricated from multiple, separately formed pieces or sub-panels, or the first panel may be formed as a single piece. The first panel 22 may be formed from any suitable material or materials (for example, polymers, metals, etc.) using any suitable methods, such as molding, forming, etc.

The first panel 22 may include a first opening 24 structured to enable fluid communication between a first side 22a of the first panel and a second side 22b of the first panel 22 residing opposite the first side 22a. The first side 22a of the first panel 22 may be structured to provide an uppermost or top surface of the tonneau cover when the cover is mounted on the vehicle 19 so as to cover a vehicle cargo bed 19c. In one or more arrangements, the first opening 24 may be structured to serve as an inlet to tonneau cover first airflow passage 26. Referring to the drawings, the first airflow passage 26 may extend along the interior 20e of the tonneau cover. First airflow passage 26 may be in fluid communication with the first opening 24 and may extend along the second side 22b of the first panel 22 opposite the first side 22a.

The airflow inlet may be structured to enable airflow from an exterior of the tonneau cover into a first end 26a (FIG. 3A) of the first airflow passage 26. For this purpose, the first opening 24 may be positioned at a location on the first panel 22 where an airstream flowing over the tuck cab 19a and down onto the tonneau cover 20 may enter and/or be directed into the opening 24. In one or more arrangements, the airflow inlet may be located between the airflow outlet (described in greater detail below) and the tonneau cover second end 20b. Possible locations of the first opening 24 along the tonneau cover 20 suitable for fluid communication with an airflow streaming over the cab of a truck on which the cover is mounted and over the top of the tonneau cover may be determined by analysis and/or experimentation using known methods (for example, wind tunnel testing). Although the embodiments in the drawings show a single first opening 24, multiple first openings may be provided for receiving and conveying air into the first airflow passage 26.

Referring to the drawings, a first door 32 may be rotatably mounted to the first panel 22 using a hinge 22g or other suitable means. The first door 32 may be operable to permit a flow of air through the first opening 24 between the first side 22a of the first panel 22 and the first airflow passage 26. The first door 32 may also be operable to block a flow of air through the first opening 24 between the first side 22a of first panel 22 and the first airflow passage 26. A filter 32a may be positioned over an entrance to first door 32 to aid in preventing dust and particulates from entering the airflow passage 26.

Figure 3A:
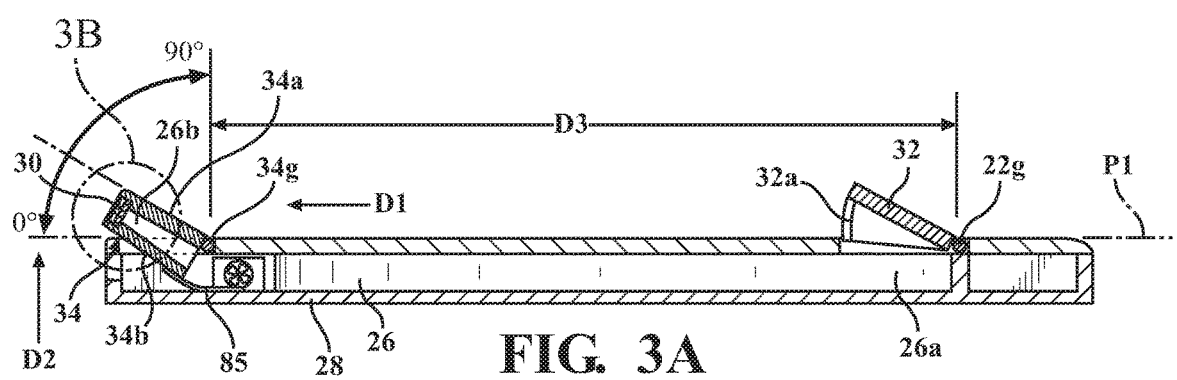
FIG. 3A is the schematic cross-sectional side view of FIG. 2, showing each of the airflow inlet door and airflow discharge door in an open condition.

In one or more arrangements, a suitable locking or securement mechanism (not shown) may be provided for securing the first door 32 in an open position as shown in FIGS. 1 and 3A, to permit air to flow into the first airflow passage 26 through first opening 24. As well as maintaining the first door 32 in a fully open position, the locking mechanism may also be structured to maintain the first door in any of a range of partially "open" positions, each of which provides an entrance to the first airflow passage 26 having a smaller cross-sectional area than provided by the fully-open position. Thus, the first door 32 may function as an inlet door for the tonneau cover 20. This enables a degree of control over the flowrate of air into the first airflow passage 26. Similarly, the locking or securement mechanism may secure the first door 32 in a closed position (as shown in FIG. 2), to prevent air from flowing into the first airflow passage 26 through first opening 24, and to provide a smooth outer surface of the tonneau cover 20 for air to flow over when the first airflow passage 26 is not in use. In the closed position, the first door 32 may also prevent rain and snow from entering the first airflow passage 26. A weather-tight seal may be provided between the first door 32 and the first opening 24. In one or more arrangements, the first door 32 may be structured and mounted so as to "scoop" or channel moving air flowing over the tonneau cover into the first opening 24 when the door is in an open condition.

In one example of a locking mechanism, a hinge or shaft connecting the door to the remainder of the tonneau cover may be coupled to a spiral wound spring or another type of spring. The spiral spring may be structured to bias the door toward the closed condition. A ratchet may be attached to the shaft, and a spring-loaded pawl may be rotatably mounted to the remainder of the tonneau cover adjacent the door. The ratchet and pawl may be engageable to hold the door in any one of several partially open configurations as a user rotates the door and ratchet against the biasing force of the spring. The user may manually disengage the pawl in a known manner to allow the spring to close the door.

In one or more arrangements, the tonneau cover 20 also includes a second panel 28 positioned opposite the first panel 22 and secured to the first panel using any suitable method(s), such as mechanical fasteners, for example. The second panel 28 may be structured to be a bottom panel of the tonneau cover 20 when the cover 20 is secured to the vehicle 19 so as to cover the vehicle cargo bed 19c. The bottom panel 28 of the tonneau cover 20 may reside directly above the cargo bed 19c when the tonneau cover 20 is mounted on the vehicle 19. The second panel 28 may include a cavity 28a formed therein to define the sides and bottom of the first airflow passage 26. The first panel 22 may be secured on a top surface of the second panel 28 to enclose and form a top of the first airflow passage 26.

Figure 4:
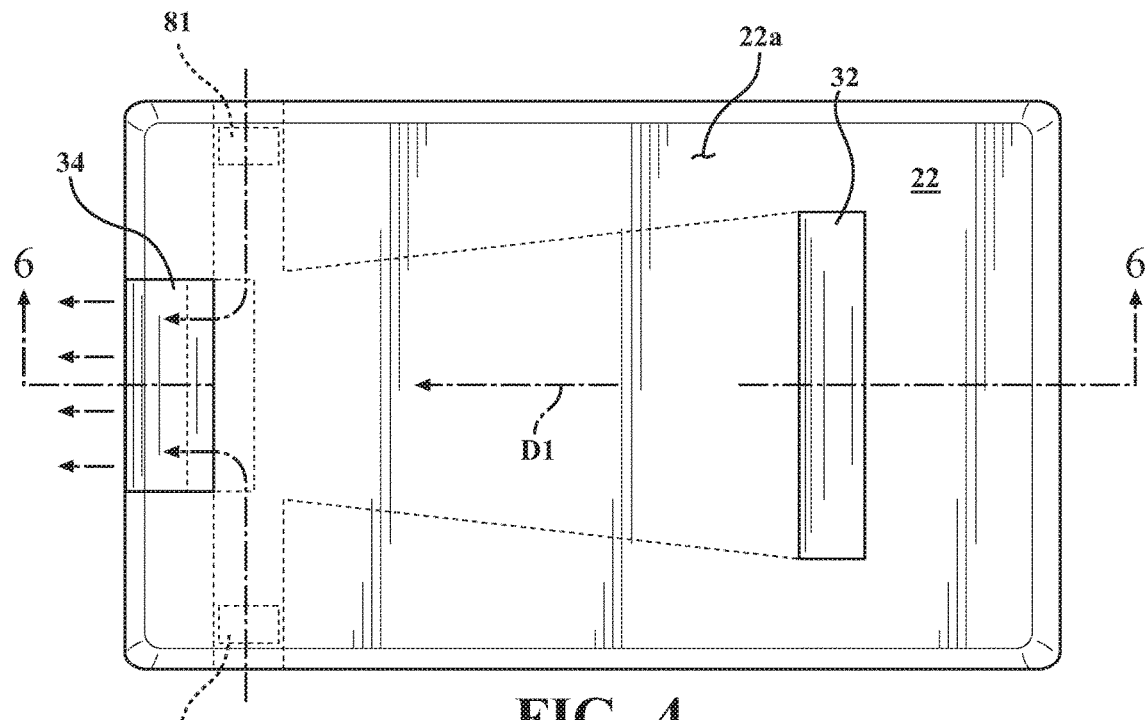
FIG. 4 is a schematic plan view of the tonneau cover shown in FIG. 2.
Figure 5:
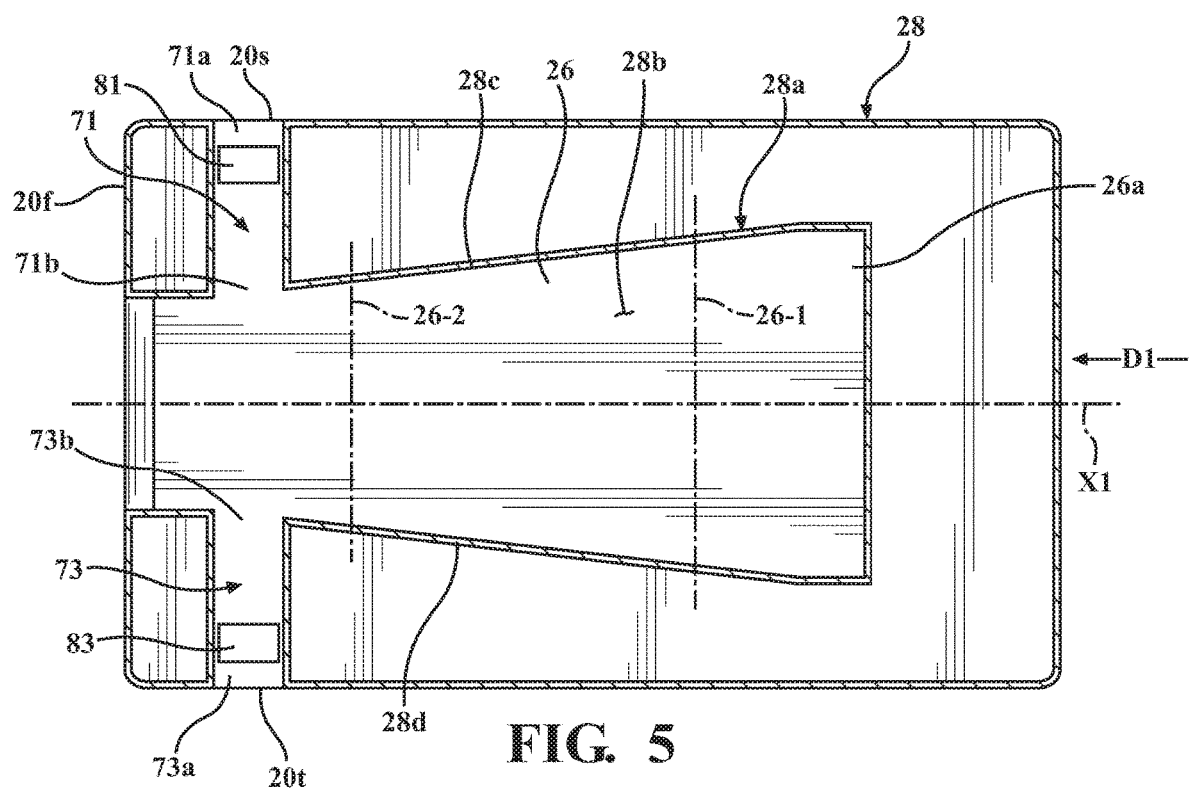
FIG. 5 is a schematic plan view of the tonneau cover of FIG. 4 showing the bottom panel of the cover with the top panel removed from the cover.

FIG. 4 is a schematic plan view of the tonneau cover shown in FIG. 2. FIG. 5 is a schematic plan view of one embodiment of one embodiment of the bottom panel 28, with the top panel 22 removed from the tonneau cover. Referring to FIG. 5, the first airflow passage 26 may be defined by portions of the first panel 22 and/or the second panel 28. For example, the second panel 28 may include cavity 28a formed therein. Cavity 28a may define a floor or bottom 28b and side walls 28c, 28d of the first airflow passage 26. In addition, a cross-sectional area of the first airflow passage 26 may decrease in a direction D1 extending from the airflow inlet 24 toward an airflow outlet 30 (described in greater detail below). The first panel 22 may be secured atop the second panel 28 so as to cover the cavity 28a to form a top wall of the first airflow passage 26. The first and second panels 22, 28 may be structured to provide a gas tight or substantially gas tight seal therebetween along seams or contact surfaces thereof, so as to seal the first airflow passage 26. The cross-sectional area of the first airflow passage 26 at any location along the passage may be measured along planes (such as planes 26-1 and 26-2 shown in FIG. 5) taken perpendicular to an axis X1 extending in a direction D1 from the cover first end toward the cover second end.

A front edge 20f of the tonneau cover 20 may be an edge structured to reside adjacent to and closest to a cab 19a of the pickup truck 19 when the tonneau cover 20 is mounted on the pickup truck so as to cover the cargo bed, as shown in FIG. 6. In the particular embodiment shown in the drawings, the axis X1 is selected to extend parallel to a fore-aft axis X2 of the pickup truck 19 when the cover 20 is mounted on the truck so as to cover the cargo bed 19c, as shown in FIG. 6.

Referring to the drawings, a first airflow passage outlet (generally designated 30) may be incorporated into an airflow discharge door 34 defining the second end 26b of the first airflow passage 26. The discharge door 34 may have an outer wall 34a and an inner wall 34b positioned opposite the outer wall 34a. A second end 26b of the first airflow passage 26 may reside between the outer wall 34a and the inner wall 34b. The discharge door 34 may be rotatable between a closed configuration as shown in FIG. 2 in which an outer surface 34a-1 of the outer wall 34a is coplanar or substantially coplanar with a plane P1 defined by the top surface 22a of the tonneau cover first side 20c, and an open configuration (shown in FIGS. 3A, 3B, and 6) in which the outer wall outer surface 34a-1 extends out of the plane P1. As used herein, the term "substantially" includes exactly the term it modifies and slight variations therefrom. Thus, the term "substantially coplanar" means exactly coplanar and slight variations therefrom. In this particular example, slight variations therefrom can include within normal manufacturing tolerances, within a tolerance zone defined by horizontal planes parallel to plane P1 and extending 0.5 inches to either side of the plane P1.

Figure 3B:
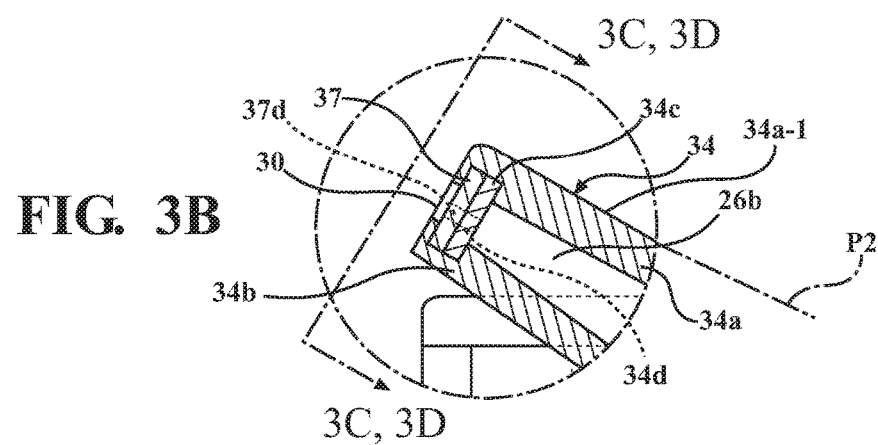
FIG. 3B is a magnified schematic cross-sectional side view of a portion of the airflow discharge door shown in FIG. 3A.

As seen in FIGS. 2 and 3A-3B, the discharge door inner wall 34b may be angled with respect to the door outer wall 34a so that the door inner wall 34b extends toward the door outer wall 34a in a direction moving toward the diffuser wall 34c (described below). Thus, the cross-sectional area of the first airflow passage 26 may continue to decrease as the airflow in the first airflow passage proceeds through the discharge door 34 toward the diffuser wall 34c. The decrease in cross-sectional area of the first airflow passage 26 as the airflow proceeds toward the first airflow passage outlet 30 helps to increase the velocity of the airflow exiting the second end of 26b the first airflow passage 26 to the exterior of the tonneau cover 20.

Referring to FIGS. 2 and 3A, in one or more arrangements, an elastic membrane 85 may have a first portion attached to the discharge door inner wall 34b and a second portion attached to the second panel 28. Membrane 85 may serve as a seal between discharge door inner wall 34b and second panel 28 when the discharge door 34 is opened or raised. As seen in FIG. 3A, when discharge door 34 is opened, membrane 85 may stretch to form a seal blocking the air flowing in first airflow passage 26 from exiting the passage 26 between the discharge door inner wall 34b and the second panel 28. Membrane 85 may be formed from a suitably stretchable rubber. Alternatively, other methods may be used to seal the gap between the discharge door inner wall 34b and second panel when the discharge door 34 is opened.

Figure 3C:
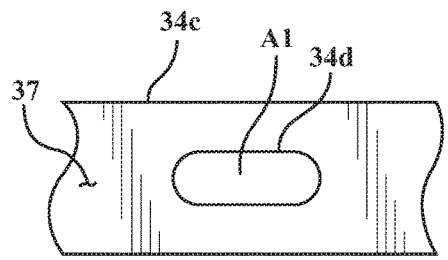
FIG. 3C is an end view of a portion of the airflow discharge door shown in FIGS. 2-3B, showing a condition where an airflow discharge opening cross-sectional area is at a maximum value.
Figure 3D:
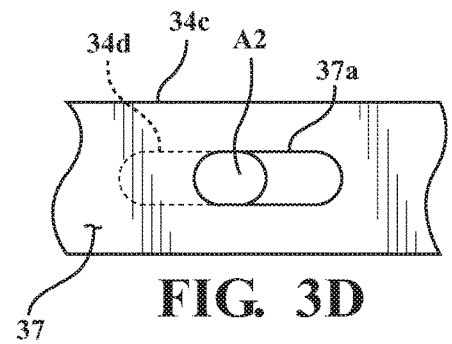
FIG. 3D is the end view of FIG. 3C showing a condition where an airflow discharge opening cross-sectional area of the discharge door is at a less-than-maximum value.

The discharge door 34 may include diffuser wall 34c extending along the second end 26b of the airflow passage 26 and between the door outer wall 34a and the door inner wall 34b to regulate the discharge of air from the first airflow passage 26. The diffuser wall 34c may include a plurality of spaced apart airflow discharge openings 34d positioned therealong. In particular embodiments, the airflow discharge openings 34d are structured to discharge air from the first airflow passage second end 26b in directions parallel to a plane P2 defined by the outer surface 34a-1 of the door outer wall 34a. This structure enables a high degree of control over the airflow discharge direction, by simply rotating the discharge door 34 to a desired angular orientation with respect to a position and orientation of the rear of the cab 19a when the tonneau cover 20 is mounted on the truck 19 so as to cover the cargo bed 19c. However, the airflow discharge openings 36d may alternatively be structured to discharge air from the airflow passage second end 26b in directions not parallel to the plane P2 of the outer surface 34a-1 of the door 34. In addition, all of the airflow discharge openings 34d may be structured to discharge airflow from the second end 26b of the airflow passage 26 in associated streams which are parallel or substantially parallel to each other as they exit the openings. In one or more arrangements, the airflow discharge openings 34d may be in the form of elongated slots as shown in FIGS. 3C and 3D. Alternatively, the openings 34d may be circular.

In one or more arrangements, an adjustable grating 37 may be slidably positioned over the diffuser wall 34c. The grating 37 may be slidably mounted in a slot extending along the discharge door 34 adjacent the diffuser wall 34c, for example. In one or more arrangements, the adjustable grating 37 may be structured to extend along or parallel with the front edge 20f of the tonneau cover 20 when the discharge door 34 is in a closed configuration.

Referring to FIGS. 3B-3D, the adjustable grating 37 may include openings 37a structured to adjustably coextend or align with associated ones of discharge openings 34d formed along the diffuser wall 34c, when the grating 37 is slidably positioned over the diffuser wall 34c. The grating 37 may be structured and mounted to the discharge door 34 so that grating openings 37a adjustably coextend or align with associated ones of the openings 34d. This enables the effective cross-sectional areas of the airflow discharge openings 34d from the airflow passage second end 26b to be varied by movement of the grating 37 along the diffuser wall 34c. "Adjustably align" as used herein means that the positions of the grating openings 37a may be adjusted so as to overlap associated ones of the diffuser wall openings 34d to varying degrees.

Referring to FIGS. 3C and 3D, the effective cross-sectional area of an airflow discharge opening may be the overlapping region of a diffuser wall opening 34d and an adjacent grating opening 37d, which allows a stream of the airflow to exit the airflow passage second end 26b. For example, FIG. 3C shows a position of grating 37 with respect to diffuser wall 34c which provides maximum alignment and overlap of a grating opening 37a and an adjacent, associated diffuser wall opening 34d, thereby allowing maximum cross-sectional area A1 and maximum airflow from the openings in the second end 26b of the first airflow passage 26. FIG. 3D shows another arrangement in which the grating 37 is moved with respect to the diffuser wall 34c so that a portion of the diffuser wall opening 34d shown is occluded or blocked by a portion of the grating 37, thereby providing a relatively smaller effective cross-sectional area A2 available for exit airflow. In this manner, the velocity of the airflow streams leaving the first airflow passage 26 may be controlled by constricting or expanding the openings through which the airflow can exit the first airflow passage 26. In one or more arrangements, the grating 37 may be manually adjustable to vary the effective cross-sectional areas the first airflow passage discharge openings. In one or more arrangements, the discharge door 34 may be structured so that the grating 37 forms part of the forward or front edge 20f of the tonneau cover 20 when the door 34 is in the closed position.

Referring to FIGS. 3A and 6, in one or more arrangements, the airflow discharge door 34 may be structured to be rotatable so as to provide an airflow discharged from the first airflow passage 26 so as to have a component extending in the direction D1 from the airflow inlet 24 toward the airflow outlet 30, and also a component extending in a direction D2 from the tonneau cover second side 20d toward the tonneau cover first side 20c. This airflow may be discharged from the first airflow passage 26 so as to impinge on a rear surface of the cab 19a of the pickup truck 19 and flow upwardly along a rear surface 19r of the cab toward a roof of the cab, as shown in FIG. 6.

When the tonneau cover 20 is mounted on the truck 19 so as to cover the cargo bed 19c, the discharge door 34 may be rotated to a desired angle with respect to the remainder of the tonneau cover 20 and secured in the desired angle using a discharge door locking mechanism as described below. The range of angles to which discharge door 34 may be rotated and secured may define a range of directions in which the airflow passage discharge openings 34d, 37a may be oriented so as to direct the discharge airflow from the airflow outlet 30 according to the requirements of a particular application. In a particular arrangement, the range of angles to which discharge door 34 may be rotated and secured is $0<x<90°$ as shown in FIG. 3A.

In one or more arrangements, the discharge door 34 may be rotatably attached to the first panel using a hinge 34g or similar means. A suitable locking or securement mechanism (not shown) may be provided for securing the discharge door 34 in any of a variety of desired orientations, in a manner similar to the first door 32. In one example of a locking mechanism, a hinge or shaft connecting the door to the remainder of the tonneau cover may be coupled to a spiral wound spring or another type of spring. The spiral spring may be structured to bias the door toward the closed condition. A ratchet may be attached to the shaft, and a spring-loaded pawl may be rotatably mounted to the remainder of the tonneau cover adjacent the door 34. The ratchet and pawl may be engageable to hold the door in any one of several partially open configurations as a user rotates the door and ratchet against the biasing force of the spring. The user may manually disengage the pawl in a known manner to allow the spring to close the door.

A distance D3 (FIG. 3A) between the airflow inlet 24 and the discharge door 34 may be determined according to the requirements of a particular pickup truck. For example, the distance D3 may be specified so as to minimize the length of the first airflow passage 26 (thereby reducing airflow pressure losses along the passage 26) while ensuring a sufficient airflow into the inlet 24 to provide the desired aerodynamic effects on the air flowing over the cab 19a, as described herein.

Referring to the drawings, particular embodiments of the tonneau cover may include at least one supplemental airflow passage. The embodiment shown in the drawings has a pair of supplemental airflow passages 71 and 73. Each supplemental airflow passage may have a first end located along or adjacent a surface of the tonneau cover and in fluid communication with an exterior of the tonneau cover, and a second end in fluid communication with the first airflow passage 26. For example, supplemental airflow passage 71 has a first end 71a located along or adjacent a first side edge 20s of the tonneau cover, and a second end 71b in fluid communication with the first airflow passage 26. Supplemental airflow passage 73 has a first end 73a located along or adjacent a second side edge 20t of the tonneau cover, and a second end 73b in fluid communication with the first airflow passage 26.

Each supplemental airflow passage may be structured to enable mounting of an impeller therein. Impellers 81, 83 may be mounted in each of respective ones of supplemental airflow passages 71 and 73. Each impeller may be structured to draw air into its associated supplemental airflow passage from an exterior of the tonneau cover 20. The air drawn into the supplemental airflow passages 71 and 73 by impellers 81, 83 may become entrained in the main airflow through the first airflow passage 26 (from opening 24 toward airflow outlet 30) and may enter the second end 26b of the first airflow passage 26 defined by the discharge door 34. The air from the supplemental airflow passages 71, 73 may supplement the airflow through the first airflow passage 26, to aid in increasing the velocity of the discharge airflow from the diffuser wall/grating. The impellers 81, 83 may be configured for variable speed control, so that a user may vary the rotational speed of the impeller(s) to vary the flowrate of air being drawn into the first airflow passage second end 26b.

One or more of the impellers 81, 83 may be portable and separate from the tonneau cover 20 and may be positionable by a user in their respective airflow passages 71, 73 as desired. Alternatively, one or more of the impellers 81, 83 may be part of the tonneau cover 20 and may be mounted to or otherwise connected to the remainder of the tonneau cover. One or more of the impellers 81, 83 may have independent power sources, such as internal batteries (not shown). Alternatively, one or more of the impellers 81, 83 may be powerable by a power source(s) mounted in (or connected to) the tonneau cover 20. For example, the tonneau cover 20 may be configured for connection to a vehicle power source (such as the vehicle battery or another power supply) (not shown) which may be usable to power the impeller 51.

In alternative embodiments of the tonneau cover, the cover may have impeller cavities without impellers, or the cover may not have impeller cavities or impellers.

Operation of the tonneau cover 20 will now be described with reference to the drawings.

Referring to the drawings and in particular to FIG. 6, as the vehicle 19 moves, air generally flows over and around the vehicle in a pattern indicated by arrow AF1. The airflow may proceed over the vehicle cab 19a, then down onto the tonneau cover 20. A portion of the airflow may impinge upon the open first door 32 and be directed into the first opening 24. Another portion of the airflow over the cab 19a may follow a contour of the cab toward a region that would reside behind the cab and just above a conventional flat tonneau cover. The airflow in this region may be relatively turbulent, which may increase drag on the moving vehicle.

As seen in FIG. 6, when doors 32 and 34 are opened, airflow may proceed along the path indicated by arrow AF1 and into opening 24 and along the airflow passage 26, in a direction extending from a rear end 20b of the tonneau cover toward a front end 20a of the tonneau cover. Because the airflow discharge door 34 is angled upwardly with the airflow outlet 30 facing the rear of the cab 19a, the discharged air may flow from the first airflow passage out of the airflow outlet 30 upwardly and into and along the rear exterior surface 19r of the cab 19a. This discharge airflow acts to disrupt and deflect the downward airflow along the rear surface 19r of the cab, thereby preventing air flowing over the cab 19a from flowing behind the cab and forming a turbulent air region. The air discharged from the tonneau cover 20 through the discharge door may deflect the air flowing over the cab 19a and toward the rear of the cab back into the airstream AF1 flowing toward the rear of the vehicle.

An embodiment of the tonneau cover 20 may have any height H1 suitable for the purposes described herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A tonneau cover for a vehicle cargo bed, the tonneau cover comprising:
    a first airflow passage extending along an interior of the tonneau cover;
    an airflow inlet structured to enable airflow from an exterior of the tonneau cover into the first airflow passage; and
    an airflow outlet structured to enable a discharge of air from the first airflow passage to an exterior of the tonneau cover,
    wherein a cross-sectional area of the first airflow passage decreases in a direction extending from the airflow inlet toward the airflow outlet.

2. The tonneau cover of claim 1 wherein the tonneau cover has a first end and a second end residing opposite the first end, wherein the airflow inlet is located between the airflow outlet and the tonneau cover second end.

3. The tonneau cover of claim 1 further comprising an airflow discharge door structured to be rotatable between a closed configuration in which an outer surface of the airflow discharge door is flush or substantially flush with a plane defined by a first side of the tonneau cover, and an open configuration in which the airflow discharge door outer surface extends out of the plane.

4. The tonneau cover of claim 3 wherein the airflow discharge door includes a diffuser wall extending along an end of the first airflow passage, the diffuser wall including a plurality of spaced apart airflow discharge openings positioned therealong and structured to enable fluid communication between the first airflow passage and an exterior of the tonneau cover.

5. The tonneau cover of claim 4 wherein the airflow discharge openings of the plurality of airflow discharge openings are structured to discharge air from the first airflow passage end in directions parallel to a plane P1 of an outer surface of the discharge door.

6. The tonneau cover of claim 4 wherein each airflow discharge opening of the plurality of airflow discharge openings is structured to discharge airflow from the end of the first airflow passage in an associated air stream, and wherein the airflow discharge openings of the plurality of airflow discharge openings are structured so that air streams produced by the airflow discharge openings are parallel to each other as they exit the openings.

7. The tonneau cover of claim 4 wherein at least one opening of the plurality of spaced apart airflow discharge openings is in the form of an elongated slot.

8. The tonneau cover of claim 7 further comprising a grating slidably positioned over the diffuser wall, the grating including a plurality of openings extending therethrough, and wherein the openings of the plurality of grating openings are structured to adjustably align with associated ones of the openings of the plurality of openings formed along the diffuser wall when the grating is slidably positioned over the diffuser wall.

9. The tonneau cover of claim 1 further comprising at least one supplemental airflow passage having a first end located along a surface of the tonneau cover, and a second end in fluid communication with the first airflow passage.

10. The tonneau cover of claim 9 further comprising an impeller positioned in fluid communication with the at least one supplemental airflow passage.

* * * * *